United States Patent
Bruno et al.

(10) Patent No.: US 8,121,491 B2
(45) Date of Patent: Feb. 21, 2012

(54) METHOD, APPARATUS AND DATA CARRIER FOR COMPENSATING FOR CHANNEL DEPLETION OF A MULTI-CHANNEL SIGNAL IN AN OPTICAL LINK OR OPTICAL NETWORK

(75) Inventors: Gianmarco Bruno, Genoa (IT); Fabio Cavaliere, Vecchiano (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 697 days.

(21) Appl. No.: 12/097,670

(22) PCT Filed: Oct. 6, 2006

(86) PCT No.: PCT/EP2006/009677
§ 371 (c)(1),
(2), (4) Date: Sep. 10, 2008

(87) PCT Pub. No.: WO2008/040376
PCT Pub. Date: Apr. 10, 2008

(65) Prior Publication Data
US 2009/0003839 A1    Jan. 1, 2009

(51) Int. Cl.
*H04B 10/00* (2006.01)

(52) U.S. Cl. ........... 398/177; 398/181

(58) Field of Classification Search .......... 398/177, 398/181
See application file for complete search history.

(56) References Cited

U.S. PATENT DOCUMENTS

| 6,441,950 | B1* | 8/2002 | Chen et al. ............... 359/334 |
| 6,466,712 | B1* | 10/2002 | Christodoulides et al. ..... 385/24 |
| 7,394,590 | B2 | 7/2008 | Iizuka et al. |
| 2003/0025990 | A1 | 2/2003 | DeGrange, Jr. et al. |

FOREIGN PATENT DOCUMENTS

JP    2005-005538    1/2005

OTHER PUBLICATIONS

McIntosh, C. M. et al. "Eliminating SRS Channel Depletion in Massive WDM Systems via Optical Filtering Techniques." IEEE Photonics Technology Letters, vol. 13, No. 4, Apr. 2001, pp. 302-304. XP-001100787.

* cited by examiner

*Primary Examiner* — Kinam Park
(74) *Attorney, Agent, or Firm* — Coats & Bennett, P.L.L.C.

(57) ABSTRACT

A method and apparatus for compensating for channel depletion of a multi-channel signal in an optical link or optical network comprising a chain of optical amplifiers. The method comprises determining channel depletion for each amplifier from the power of the input signal to the optical amplifier and the power of the output signal from the previous amplifier. Each amplifier is then controlled to amplify the signal to a level equal to the nominal (ideal) power plus the calculated channel depletion for that amplifier.

24 Claims, 1 Drawing Sheet

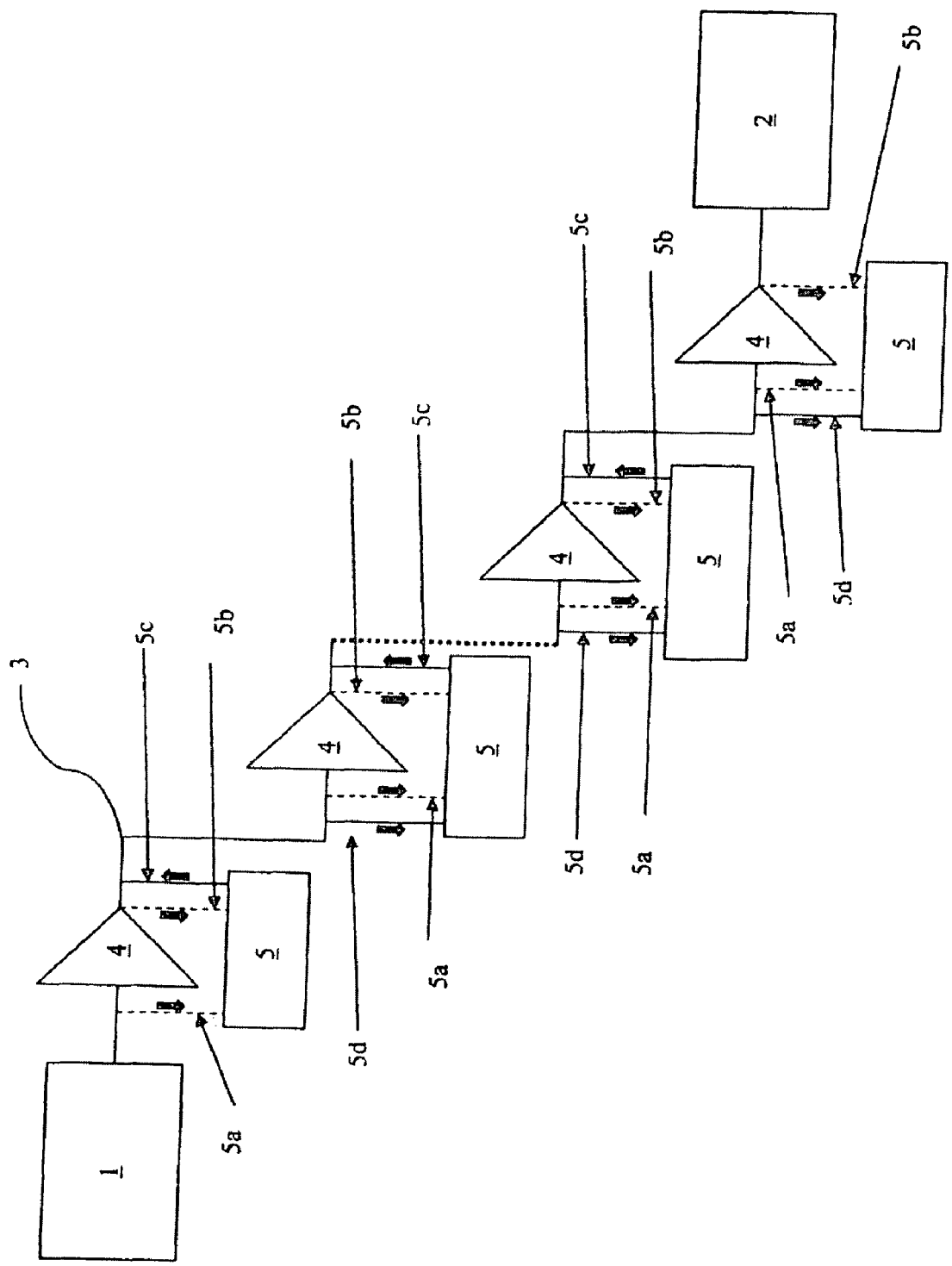

METHOD, APPARATUS AND DATA CARRIER FOR COMPENSATING FOR CHANNEL DEPLETION OF A MULTI-CHANNEL SIGNAL IN AN OPTICAL LINK OR OPTICAL NETWORK

This invention concerns a method, apparatus and data carrier for compensating for channel depletion of a multi-channel signal in an optical link or optical network. The invention has particular, but not exclusive, application to a method, apparatus and data carrier for compensating for channel depletion in multi-span wavelength division multiplex (WDM) links and networks.

The optical transmission of a multi-channel optical signal over a long distance link or network (100 km+) requires a series of amplifiers to boost the power of the signal, compensating for attenuation of the signal as it travels through the link or network. The multi-channel signal typically comprises a plurality of channel signals. The gain or power control of each optical amplifier typically relies on monitoring the total power of the input signal and output signal for each optical amplifier and comparing the monitored power to a nominal (ideal) total power and controlling operation of the optical amplifier such that the total output power is substantially equal to the nominal total power. The nominal total power is the sum of the target powers for the channels in the multi-channel signal and is determined based on the design requirements of an optical link.

A problem with this regime is that it fails to take into consideration noise introduced into the multi-channel signal by the optical amplifiers as it is transmitted along the optical link. On amplification, the amplifiers introduce noise into the multi-channel signal and this noise contributes to the monitored total power of the multi-channel signal output from the amplifier and, consequently, to the multi-channel signal input to the next amplifier in the chain. Accordingly, when the multi-channel signal is amplified to have a power equal to the nominal total power, a proportion of the power is taken up by noise resulting in the power of each channel being below the target power. This effect is referred to hereinafter as channel depletion and increases with amplifier gain and with the number of amplifiers in the link, becoming dramatic for long-haul links (such as links whose distance exceeds 3000 km).

According to a first aspect of the invention there is provided a method of controlling a chain of amplifiers in an optical link or an optical network comprising monitoring the total power level of a multi-channel signal output from each amplifier and controlling the optical amplifiers such that the total power of the output signal for each optical amplifier is equal to the sum of a predetermined nominal total power level and a compensatory power level for that amplifier, wherein the compensatory power level for each amplifier is determined, at least in part, from an estimate of the channel depletion in that amplifier.

By boosting the output signal of the amplifiers to a level above the nominal power level, the invention advantageously counteracts the effect of channel depletion.

The estimate of channel depletion may be calculated from predetermined noise characteristics established for the amplifier and power of an input signal to the amplifier. The estimate of the channel depletion, D, may be calculated using the equation, $$D = C \cdot \log\left(1 + \frac{k}{P_{in}}\right),$$

where C is a constant, such as 10, k is a constant dependent on the characteristics of the amplifier and $P_{in}$ is the monitored total input signal power to the amplifier. In this way, compensation is made for channel depletion resulting from noise introduced by the amplifier.

Simply treating each amplifier of the chain independently and determining the channel depletion, D, from the power of the input signal to the amplifier may be satisfactory for a chain comprising a small number of amplifiers. However, as the number of the amplifiers in the chain increases this method loses efficiency. An increase in the total power output of one amplifier in the chain results in an increase in the total input power to the next amplifier in the chain. This has the positive effect of reducing channel depletion in the next amplifier. However, the input to the next amplifier will also include a level of noise introduced by the previous amplifier. This noise level will contribute to the monitored power of the input signal resulting in equation 1 (which assumes a clean input signal) underestimating the channel depletion in the next amplifier. Accordingly, a residual channel depletion remains for each amplifier after the first. This effect grows as the number of amplifiers in the chain increases.

Therefore, in a preferred arrangement, the estimate of the channel depletion for each amplifier further takes into account the compensatory power level used by the previous amplifier in the chain. In this way, the compensatory power level for any specific amplifier takes account of channel depletion resulting from noise that will be introduced to the output signal by that amplifier and noise already introduced to the signal by preceding amplifiers. Accordingly, compensation is made for residual channel depletion caused by underestimation of the power of the channels in the multi-channel input signal.

Preferably, the compensatory power level for amplifier, n, in the optical link or optical network is the sum of the estimated channel depletion caused by amplification noise introduced by that amplifier, and the compensatory power level for the previous amplifier.

Advantageously, the compensatory power level for the previous amplifier in the chain is determined from the monitored total power of the signal output from the previous amplifier. The compensatory power level for the previous amplifier may be calculated by subtracting the nominal total power level from the monitored total power of the signal output from the previous amplifier.

This is advantageous as the monitored total power of the signal output from the previous amplifier can be transmitted via an optical supervisory channel. Therefore, in accordance with this arrangement, the method may comprise, for each amplifier, sending a control signal indicative of the total output power of the amplifier to the next amplifier in the chain. The method may be used in a WDM communication link or optical network and the control signal may be sent on the supervisory channel of the WDM signal.

According to a second aspect of the invention there is provided a data carrier carrying instructions that, when executed on a processor of a control unit of an optical amplifier, causes the control unit to monitor total power of a multi-channel signal output from the amplifier and control the amplifier such that the total power of the signal output from the amplifier is equal to the sum of a predetermined nominal power level and a compensatory power level, wherein the compensatory power level is determined, at least in part, from an estimate of channel depletion in that amplifier.

The instructions may cause the control unit to monitor power of the input signal to the amplifier and calculate from the power of the input signal and the noise characteristics of the amplifier, the estimate of channel depletion in the amplifier.

The compensatory power level may be determined by summing an estimate of the channel depletion, D, caused by amplification noise introduced by the amplifier to the compensatory power level for a previous amplifier in a chain in which the amplifier is connected. The instructions may cause the control unit to determine, from the input signal, the compensatory power level for the upstream amplifier.

The instructions may cause the control unit to determine a total output power level of the previous amplifier from the input signal and subtract the nominal power level from the determined output power of the previous amplifier to obtain a value for the compensatory power level for the previous amplifier. In one embodiment, the signal received is a WDM signal and the total power of the upstream amplifier may be determined from information sent along one channel, preferably the supervisory channel, of the WDM signal.

According to a third aspect of the invention there is provided an optical communication link or an optical network comprising a chain of amplifiers and control means for controlling operation of the amplifiers, wherein the control means comprises means for monitoring the total power of multi-channel output signals from each of the amplifiers, means for determining an estimate of channel depletion expected in each amplifier and means for controlling each amplifier to amplify the signal such that the total output power is substantially equal to the sum of a nominal total power level and a compensatory power level for that amplifier, wherein the compensatory power level for each amplifier is determined, at least in part, from the estimate of channel depletion in that amplifier.

The control means may be arranged to monitor the total input power to each amplifier and calculate an estimate of the channel depletion for each amplifier from the monitored total input power. The control means may calculate the estimate of the channel depletion using the equation, $$D = C \cdot \log\left(1 + \frac{k}{P_{in}}\right),$$

where C is a constant, k is a constant dependent on the characteristics of the amplifier and $P_{in}$ is the monitored total input signal power to the amplifier.

In a preferred arrangement, the compensatory power level for any one of the amplifiers is equal to the sum of the estimated channel depletion, D, caused by amplification noise introduced by the amplifier and the compensatory power level for the previous amplifier in the chain. Advantageously, the control means has means for receiving a signal indicative of the monitored total output power for the previous amplifier and the compensatory power level for the previous amplifier in the chain is calculated from the monitored total output power of the previous amplifier. The control means may calculate the compensatory power level for the previous amplifier by subtracting the nominal total power level from the monitored total power level of the previous amplifier.

The control means may comprise a separate local control unit for each amplifier with each control unit arranged to receive information on the total output power of the previous amplifier from the control unit of the previous amplifier via a predetermined channel, such as the supervisory channel, and send information on its total output power level via the predetermined channel to the control unit of the next amplifier in the chain. Local control units are advantageous as they avoid the need for communication links between regional or global control units and a plurality of amplifiers, reducing the complexity of the system.

According to a fourth aspect of the invention there is provided a control unit for controlling operation of an optical amplifier, wherein the control unit comprises means for monitoring total power of multi-channel signals output from the amplifier and means for controlling each amplifier to amplify the signal such that the total output power is substantially equal to the sum of a nominal total power level and a compensatory power level for the amplifier, wherein the compensatory power level is determined, at least in part, from an estimate of channel depletion in the amplifier.

The control unit may comprise means for estimating the channel depletion expected in the amplifier.

According to a fifth aspect of the invention there is provided an amplifier comprising a control unit according to the fourth aspect of the invention.

An embodiment of the invention will now be described, by example only, with reference to the drawing, which shows a schematic of an optical network in accordance with the invention.

The optical network comprises a transmitter 1 for generating a WDM optical signal, a receiver 2 for receiving the optical signal and a long haul optical communication link 3 for transmitting the signal from the transmitter 1 to the receiver 2. Positioned along the optical link 3 are Erbium Doped Fibre amplifiers (EDFAs) 4 for boosting the power of the optical signal to compensate for attenuation of the optical signal as it travels along link 3. In the drawing, four EDFAs are shown, however it will be understood that an ultra-long haul link will typically comprise more than four EDFAs (this is indicated by the dotted portion of the link 3).

Each EDFA 4 has an associated control unit 5 for controlling operation of the EDFA 4. In the drawing the control units 5 are shown as being separate from the amplifiers 4, it will be understood, however, that the control units 5 may be an integral part of the amplifier 4. Each control unit 5 has means 5a for monitoring the power of the input signal and means 5b for monitoring the power of the output signals of its associated EDFA 4. All the EDFAs 4 in the link other than the last have means 5c to transmit information along the supervisory channel of the WDM signal. All of the EDFAs 4 apart from the first, launch EDFA 4 in the link have means 5d to receive information transmitted along a supervisory channel of the WDM signal (indicated by the solid lines with arrows pointing towards the control unit 5).

In use, the control units 5 control their respective EDFAs 4 such that the total output power level, $P_{out}$, of the WDM signal for the EDFA is equal to the nominal total power level (the ideal total power if no noise was present in the WDM signal) plus a compensatory power level to compensate for channel depletion. In this embodiment, each control unit 5 controls the respective EDFA 4 such that the output power level, $P_{out}$, of the WDM signal is equal to:

$$P_{out}(n) = P^*(n) + D(n) + E(n), \qquad \text{Equation 2}$$

where $P^*(n)$ is the nominal total power for the nth amplifier in the chain, $D(n)$ is an estimate of the channel depletion for the nth amplifier before taking account of noise present in the input signal and $E(n)$ is the extra-power level required to compensate for residual channel depletion in the nth amplifier resulting from noise present in the input signal. In this equation, n=0 for the launch amplifier.

A target power is determined for each channel. The nominal total power, P*, is proportional to the sum of the target powers for the channels of the WDM signal and is pre-programmed into the control units 5. The channel target power depends on the system manufacturer and the configuration of the optical link/network.

The control units 5 calculate the channel depletion for the amplifier of the link 3 from the monitored total input power level, $P_{in}$ in accordance with the equation below:

$$D = 10 \cdot \log_{10}\left(1 + \frac{k}{P_{in}}\right),\qquad \text{Equation 1}$$

where k is a constant dependent on the noise characteristics of the amplifier and $P_{in}$ is the monitored total input signal power to the amplifier. Constant k can be determined during manufacture of the amplifier or at a later date and depends on the level of noise added to the signal by the amplifier. A simple way to determine k is:
1) Set the amplifier in constant output power mode, with the total output power equal to the nominal power level, P*.
2) Put at the amplifier input a channel at an arbitrary wavelength, varying its power from the lower to the upper bounds of the input power range (this range will be defined by the amplifier's manufacturer).
3) Measuring the corresponding signal output power by means of an optical spectrum analyser for a series of input powers, typically 10 or more.
4) Finding the best fit (in the least mean square sense) of the curve $P^*-D(P_{in})$ where k is the value that allows the best fit.

E(n) is equal to the compensatory power level of the previous amplifier in the chain, n−1 and can be calculated in accordance with the following equation:

$$E(n)=[P_{out}(n-1)-P^*(n-1)],\qquad \text{Equation 3}$$

where $P_{out}$ (n−1) is the total output power of the previous amplifier and P* (n−1) is the nominal total power for the previous amplifier. In this embodiment, the control units 5 use the supervisory channel of the WDM signal to send information on its associated amplifier's total output power, $P_{out}$, to the control unit 5 of the next amplifier 4. The control unit 5 of the next amplifier 4 can then determine the compensatory power level, D(n−1)+E(n−1), of the previous amplifier 4 by subtracting the nominal power level, P*(n−1), from the total output power, $P_{out}$(n−1). In an alternative embodiment, the control units 5 transmit information on the compensatory power level along the supervisory channel to the control unit 5 of the next amplifier 4.

Accordingly, the amplifiers 4 of the invention compensate for channel depletion by adjusting their output power by a compensatory level above the nominal total power level. In the described embodiment, the compensatory level for each amplifier 4 is equal to an estimate of the channel depletion in the amplifier, determined from the input power to the amplifier 4 and the output power of the preceding amplifier, transmitted by means of the supervisory channel of the WDM signal.

The appendix attached hereto explains how to derive the relationships used to determine channel depletion.

APPENDIX

Derivation of Equation (1)

The total EDFA (Erbium Doped Fibre Amplifier) output power is the sum of the amplified signal term and a noise term:

$$P_{out}=S+N$$

S can be obtained by weighting the input power spectral density $S_{in}(f)$ with the gain spectrum g(f) and integrating over the working band (w.g. C without loss of generality).

In general, $S_{in}(f)$ has a continuous part, representing the ASE (amplified Spontaneous Emission) noise incoming from previous EDFAs, and a discrete part, corresponding to WDM channels.

$$S=\int_{c\_band}S_{in}(f)\cdot g(f)df$$

g(f) is ever positive so, according to a known calculus theorem, a frequency value ξ exists so that $$S=g(\xi)\int_{c\_band}S_{in}(f)\cdot df=g(\xi)\cdot P_{in}$$

Two examples clarify the physical meaning of g(ξ): if the noise is negligible and just one channel is present at the amplifier input, g(ξ) is the value of the gain spectrum at the channel frequency. In this case, $\max_\xi g(\xi)-\min_\xi g(\xi)$ is the EDFA gain flatness. If no channels are present at the amplifier input but just white noise with $S_{in}(f)=W$, g(ξ) is average gain over all the C band and ξ can be considered as the "barycentre" of the gain spectrum. Finally, it should be noticed g(ξ) depends on the total gain G (that is the ratio between output and input power), as will be discussed later.

The noise generated by the EDFA can be written as:

$$N=\int_{CBand}h\cdot f\cdot nf(f)\cdot g(f)df$$

For another well known theorem, another frequency ν exists so that $$\int_{CBand}h\cdot f\cdot nf(f)\cdot g(f)df=h\cdot\nu\cdot nf(\nu)\cdot g(\nu)\cdot B$$

where B is the EDFA bandwidth.

Defining the three quantities:

$$g(\xi)\equiv g$$

$$a \equiv \frac{nf(\nu)\cdot g(\nu)}{nf\cdot g(\xi)},$$

where nf is an arbitrary "typical" noise figure, and $$N_{in}\equiv h\cdot\nu\cdot nf\cdot B$$

we can write $$P_{out}=g\cdot P_{in}+a\cdot g\cdot N_{in}$$

The factor a takes into account two effects: first, the ASE and the gain spectra not having exactly the same shape but differing because the nf dependence on the frequency; second, the "useful" gain g being different from the average gain, because of the gain flatness.

$N_{in}$ can be considered as an equivalent input noise, as if the amplifier were noiseless and all the ASE were added at the input and then amplified. Anyway, we can simply put:

$$k=a\cdot N_{in}$$

to obtain $$P_{out} = g \cdot (P_{in} + k) \qquad \text{Equation 4}$$

or $$g = \frac{P_{out}}{P_{in} + k}$$

If the depletion is negligible, k~0 and $g=g^*=P_{out}/P_{IN}$, as expected.

The factor $$d = \frac{g}{g^*} = \frac{1}{1 + \frac{k}{P_{in}}} \qquad \text{Equation 5}$$

defines the loss of power (depletion) due to the ASE: it increases when the input power is low (high gain regime). While the equation for d seems straightforward, it should be remembered k is not known a priori but depends on the amplifier type. Furthermore, it is not exactly constant but depends on the total gain, because the gain and the noise figure spectra do change with the total gain: the working assumption to use the for practical purposes is k is almost constant, at least over the $P_{in}$ range where the depletion is not negligible.

To find a way to counteract the depletion let's multiply both the sides of the above equation 4 for g*/g:

$$\frac{g^*}{g} P_{out} = g^* \cdot P_{in} + k \cdot g^*$$

The right side has the same look of equation 4, with g* replacing g, but now $g^*P_{in}$ is just the desired output channel power. In equation 4 the left side is the total output power, so the above equation suggests we can counteract the depletion just by increasing the total output power:

$$P_{out}^{new} = \frac{g^*}{g} P_{out}, \text{ that is}$$

$$P_{out}^{new} = \frac{P_{out}}{d}$$

$$P_{out}^{new} = P_{out} \cdot \left(1 + \frac{k}{P_{in}}\right)$$

In such a way we derive equation 1.

Derivation of Equation 3

For a chain of optical amplifier, each amplifier being identified by an index n, let us assume to need an extra power E(n), to be calculated:

$$P_{out}(n-1) = P^* + D(n-1) + E(n-1) \text{ for } n \geq 1, \text{ and:}$$

$$P_{out}(0) = P^* + D(0) + E(0) = P^* + D(0) \text{ for } n=0$$

Because the depletion at the first amplifier output can be exactly counteracted, thanks to Eq. 1.

$$P_{out}(n) = P^* + D(n) + E(n)$$

If L(n) is the span attenuation between the (n−1)-th and the n-th amplifiers $$P_{in}(n) = P_{out}(n-1) - L(n) = P^* + D(n-1) + E(n-1) - L(n)$$

The total gain is:

$$G(n) = P_{out}(n) - P_{in}(n) = D(n) + E(n) - D(n-1) - E(n-1) + L(n)$$

The channel gain is $$G_c(n) = G(n) - D(n) = E(n) - D(n-1) - E(n-1) + L(n)$$

The depletion compensation condition can be written as $$G_c(n) = L(n), \text{ so}$$

$$E(n) = E(n-1) + D(n-1)$$

The sum at the right hand of this equation is the overall extra power with respect to the nominal total power P*(n−1) for the previous amplifier in the chain. Accordingly, $$E(n) = [P_{out}(n-1) - P^*(n-1)]$$

In such a way, we derive equation 3.

The invention claimed is:

1. A method of controlling a chain of amplifiers in an optical link or an optical network, comprising:
   monitoring a total power level of a multi-channel output signal; and
   controlling optical amplifiers such that each optical amplifier outputs a signal having a total power level that is equal to a sum of a predetermined nominal total power level and a compensatory power level for that amplifier, wherein the compensatory power level is determined, at least in part, from an estimate of the channel depletion in that amplifier.

2. The method of claim 1 further comprising calculating the channel depletion estimate from predetermined noise characteristics established for a given amplifier and from a power of an input signal to the given amplifier.

3. The method of claim 2 wherein the channel depletion estimate, D, is calculated using the equation;

$$D = C \cdot \log\left(1 + \frac{k}{P_{in}}\right),$$

where C is a constant,
k is a constant dependent on the characteristics of the amplifier, and
$P_{in}$ is the monitored total input signal power to the amplifier.

4. The method of claim 2 wherein calculating the channel depletion estimate for each given amplifier is further based on a compensatory power level used for a previous amplifier in a chain of amplifiers.

5. The method of claim 4 wherein the compensatory power level for each given amplifier is the sum of the estimated channel depletion caused by amplification noise introduced by that amplifier, and the compensatory power level for the previous amplifier.

6. The method of claim 5 further comprising calculating the compensatory power level for the previous amplifier in the chain of amplifiers from a monitored total output power of the previous amplifier.

7. The method of claim 6 further comprising calculating the compensatory power level for the previous amplifier by subtracting a nominal total power level from the monitored total power of the signal output from the previous amplifier.

8. The method of claim 7 further comprising, for each amplifier from the first to the penultimate, sending a control signal indicative of the total output power level of the amplifier to the next amplifier in the chain.

9. The method of claim 8 wherein the optical link or optical network comprises a WDM communication link or optical network.

10. The method of claim 9 wherein the control signal is sent on a supervisory channel of the WDM signal.

11. A non-transitory data carrier having instructions stored thereon that, when executed on a processor of a control unit of an optical amplifier, configure the control unit to:
monitor a total power of a multi-channel signal output from a given amplifier; and
control the given amplifier such that the total power of the signal output from the amplifier is equal to the sum of a predetermined nominal power level for the amplifier and a compensatory power level, wherein the compensatory power level is determined, at least in part, from an estimate of channel depletion in that amplifier.

12. The non-transitory data carrier of claim 11 wherein the instructions further configure the control unit to:
monitor a power of an input signal to a given amplifier; and
calculate an estimate of channel depletion in the given amplifier from the power of the input signal and noise characteristics of the amplifier.

13. The non-transitory data carrier of claim 12 wherein the compensatory power level is determined by summing an estimate of the channel depletion, D, caused by amplification noise introduced by the given amplifier, and a compensatory power level for a previous amplifier in a chain of amplifiers in which the given amplifier is connected.

14. The non-transitory data carrier of claim 13 wherein the instructions further configure the control unit to determine, from an input signal, the compensatory power level for the previous amplifier.

15. The non-transitory data carrier of claim 14 wherein the instructions further configure the control unit to:
determine a total output power of the previous amplifier from the input signal; and
subtract a nominal power level from the determined total output power to obtain a value for the compensatory power level of the previous amplifier.

16. An optical communication link or optical network comprising a chain of amplifiers, and a control system that controls the operation of the amplifiers, the control system comprising:
a monitoring component configured to monitor a total power of multi-channel output signals from the each of the amplifiers;
an estimating component configured to determine an estimate of channel depletion expected in each of the amplifiers; and
a controller configured to:
control a given amplifier to amplify input signals such that the total output power for that amplifier is substantially equal to a sum of a nominal total power level and a compensatory power level for that amplifier; and
determine the compensatory power level, at least in part, from a channel depletion estimate for that amplifier.

17. The optical communication link or optical network of claim 16 wherein the control system is further configured to:
monitor a total input power to the given amplifier; and
calculate the channel depletion estimate for the given amplifier from the monitored total input power.

18. The optical communication link or optical network of claim 17 wherein the control system is further configured to calculate the channel depletion estimate using the equation, $$D = C \cdot \log\left(1 + \frac{k}{P_{in}}\right),$$

where C is a constant,
k is a constant dependent on one or more characteristics of the given amplifier, and
$P_{in}$ is the monitored total input signal power to the given amplifier.

19. The optical communication link or optical network of claim 18 wherein the compensatory power level for any one of the amplifiers in the chain equals the sum of the estimated channel depletion, D, caused by amplification noise introduced by the amplifier, and the compensatory power level for a previous amplifier in the chain.

20. The optical communication link or optical network of claim 19 wherein the control system is further configured to:
receive signals indicative of the monitored total output power for previous amplifiers; and
calculate the compensatory power level for a previous amplifier in the chain from the monitored total output power of the previous amplifier.

21. The optical communication link or optical network of claim 20 wherein the control system is further configured to calculate the compensatory power level for the previous amplifier by subtracting a nominal total power level from the monitored total power level of the previous amplifier.

22. The optical communication link or optical network of claim 21 wherein the control system comprises an independent local control unit for each amplifier in the chain, with each local control unit configured to:
receive information on the total output power level of the previous amplifier from the local control unit associated with the previous amplifier via a predetermined channel of a multi-channel signal; and
send information about its total output power level to the local control unit associated with the next amplifier in the chain via the predetermined channel.

23. A control unit for controlling the operation of an optical amplifier, the control unit comprising:
a monitor configured to monitor a total power of multi-channel output signals from an amplifier; and
a controller to control the amplifier to amplify the multi-channel output signals such that a total output power for the amplifier substantially equals a sum of a nominal total power level and a compensatory power level for that amplifier, wherein the compensatory power level is determined, at least in part, from an estimate of channel depletion in that amplifier.

24. An amplifier comprising:
a control unit configured to control the operation of the amplifier, the control unit comprising:
a monitor configured to monitor a total power of multi-channel output signals from an amplifier; and
a controller to control the amplifier to amplify the multi-channel output signals such that a total output power for the amplifier substantially equals a sum of a nominal total power level and a compensatory power level for that amplifier, wherein the compensatory power level is determined, at least in part, from an estimate of channel depletion in that amplifier.

* * * * *